US008947801B1

(12) United States Patent
Jury (10) Patent No.: US 8,947,801 B1
(45) Date of Patent: Feb. 3, 2015

(54) MULTI-TRACK ASYMMETRIC READ-BACK SIGNAL CORRECTION (71) Applicant: Seagate Technology LLC, Cupertino, CA (US)

(72) Inventor: Jason Charles Jury, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/048,812

(22) Filed: Oct. 8, 2013

(51) Int. Cl.
G11B 5/02 (2006.01)
G11B 5/09 (2006.01)
G11B 5/035 (2006.01)
G11B 20/10 (2006.01)

(52) U.S. Cl.
CPC ............... *G11B 20/10324* (2013.01)
USPC ............... 360/25; 360/39; 360/65

(58) Field of Classification Search
None
See application file for complete search history.

(56) References Cited

U.S. PATENT DOCUMENTS

| 6,151,177 | A | 11/2000 | Shrinkle et al. |
| 6,208,477 | B1 | 3/2001 | Cloke et al. |
| 6,400,518 | B1 | 6/2002 | Bhaumik et al. |
| 6,519,106 | B1 | 2/2003 | Goh et al. |
| 6,587,292 | B1 | 7/2003 | Ashley et al. |
| 7,012,772 | B1 * | 3/2006 | Vis .................................. 360/46 |
| 7,092,180 | B2 | 8/2006 | Franck |
| 7,126,890 | B2 | 10/2006 | Learned et al. |
| 7,193,800 | B2 | 3/2007 | Coker et al. |
| 7,643,238 | B2 | 1/2010 | DeGroat |
| 8,077,427 | B2 | 12/2011 | Mathew et al. |
| 8,130,462 | B2 | 3/2012 | Marrow |
| 8,149,529 | B2 | 4/2012 | Mathew et al. |
| 8,300,339 | B1 | 10/2012 | Nangare et al. |
| 8,378,731 | B1 | 2/2013 | Tang et al. |
| 8,411,383 | B2 | 4/2013 | Cao et al. |
| 8,441,751 | B1 | 5/2013 | Song et al. |
| 8,665,543 | B2 | 3/2014 | Bellorado et al. |
| 2007/0041115 | A1 | 2/2007 | Lee |
| 2007/0076313 | A1 * | 4/2007 | Hutchins et al. ................ 360/46 |
| 2008/0151704 | A1 | 6/2008 | Harada |

FOREIGN PATENT DOCUMENTS

| EP | 0684484 | 11/1995 |
| EP | 0830669 | 3/2004 |
| EP | 1739674 | 1/2007 |
| WO | WO0048173 | 8/2000 |

OTHER PUBLICATIONS

Palmer, et al., "Identification of Nonlinear Write Effects Using Pseudorandom Sequences," IEEE Transactions on Magnetics, vol. MAG-23, No. 5, Sep. 1987. Palmer, et al. "Characterization of the Read/Write Process for Magnetic Recording," IEEE Transactions on Magnetics. vol. 31. No. 2. Mar. 1995.

(Continued)

*Primary Examiner* — Regina N Holder
(74) *Attorney, Agent, or Firm* — Crawford Maunu PLLC (57) ABSTRACT

Various aspects of the present disclosure are directed toward an apparatus, such as a disc drive, including a disc having multiple tracks, a magneto-resistive transducer assembly, and multiple-track signal correction circuitry. The multiple-track signal correction circuitry compensates for asymmetry in a readback signal of read data stored in at least one of multiple tracks based on different correction coefficients for respective ones of the multiple tracks.

19 Claims, 6 Drawing Sheets

(56) References Cited

OTHER PUBLICATIONS

R. Hermann, "Volterra Modeling of Digital Magnetic Saturation Recording Channels," IEEE Transactions on Magnetics, vol. 26, No. 5, Sep. 1990.

Robert D. Nowak, "Volterra Filter Identification Using Penalized Least Squares," Acoustics, Speech, and Signal Processing, May 1996. ICASSP-96. Conference Proceedings., 1996 IEEE International Conference on IEEE, 2813-2816, vol. 5.

* cited by examiner

MULTI-TRACK ASYMMETRIC READ-BACK SIGNAL CORRECTION

SUMMARY

Consistent with the present disclosure, various example embodiments are directed to an apparatus including a first circuit configured to present a readback signal and a multiple-track signal correction circuit. The first circuit is configured to present a readback signal representing data stored in at least one of multiple tracks on a data-recording disc. The multiple-track signal correction circuit is communicatively connected to the first circuit and configured to compensate for asymmetry in the readback signal using different correction coefficients for respective ones of the multiple tracks.

In an exemplary environment in which a readback signal is processed in a disc drive apparatus having a disc with multiple tracks and a magneto-resistive transducer reading targeted data stored in one of the multiple tracks, various aspects of the present disclosure are directed toward a signal correction circuit that processes the readback signal by removing or reducing the asymmetry aspects of the noise and distortion.

In other embodiments also consistent with the present disclosure, certain aspects are directed to compensating for asymmetry in the readback signal of the read data stored in at least one of multiple tracks based on different correction coefficients for respective ones of the multiple tracks.

More specific embodiments are directed to a disc drive including a disc, a transducer assembly and circuitry configured and arranged for each of an associated one of the multiple tracks of the disc. The transducer assembly is configured to read magnetically-stored data stored in multiple tracks of the disc by providing a readback signal from each of the multiple tracks. The circuitry for each of an associated one of the multiple tracks is configured with a front-end signal processing circuit that includes an amplifier for providing gain to the readback signal and an analog filter for providing a version of the readback signal in which noise, present in an output signal from the amplifier, is removed. The circuitry for each of an associated one of the multiple tracks is also configured with a signal estimation circuit that includes an analog-to-digital conversion circuit for converting an analog version of the readback signal to a digital signal, and a digital filter for shaping the digital signal and for providing estimated values of the respective readback signals based on the shaped digital signal. Further, a multiple-track signal correction circuit is included to compensate for asymmetry in the readback signal of the read data stored in at least one of multiple tracks, based on the estimated values and different correction coefficients for respective ones of the multiple tracks.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of methods, devices, and systems that store data in magnetic media which is susceptible to asymmetric noise or interference from adjacently-stored data such as data that is stored in tracks of discs and read by magneto-resistive transducers. Specific embodiments are believed to be particularly beneficial to a disc drive or other type of apparatus where data (e.g., stored in another tracked form with the data adjacently-aligned) might be susceptible to asymmetric noise or interference. While the present disclosure is not necessarily so limited, various aspects thereof may be appreciated through a discussion of examples using this context.

In certain specific embodiments, a circuit provides a readback signal to a multiple-track signal correction circuit. The readback signal represents data stored in at least one of multiple tracks on a disc of a disc drive. In this exemplary context, the circuit for presenting the readback signal can be an active or passive circuit (e.g., an amplifier or another transistor-based signal-drive circuit, or a passive signal-coupling electrode) that is part of or connected to the magneto-resistive transducer assembly. Using the readback signal, the multiple-track signal correction circuit is configured and arranged to compensate for asymmetry in the readback signal of the read data stored in at least one of the multiple tracks based on the estimated values, and different correction coefficients for respective ones of the multiple tracks.

The following describes various approaches and aspects useful for correcting (or compensating) for asymmetry in the readback signal using different correction coefficients for respective ones of the multiple tracks. These approaches and aspects may be carried out and implemented, alone or together in various combinations thereof, using one or more of the components as shown in FIGS. 1A, 1B, 3, 4, 5, and as otherwise described herein.

Other aspects are directed toward a disc drive apparatus including a disc having multiple tracks, a magneto-resistive transducer assembly, and multiple-track signal correction circuitry. The magneto-resistive transducer assembly includes a magneto-resistive transducer (or a read/write head) that reads and/or writes (magnetically-stored) data from/to the multiple tracks. The multiple-track signal correction circuitry can be implemented to compensate for asymmetry in a readback signal of read data stored in at least one of multiple tracks based on different correction coefficients for respective ones of the multiple tracks. As discussed further below, in certain specific embodiments, this correction circuitry is configured and arranged to compensate for asymmetry in the signal readback from the disc by the transducer. Depending on the specific embodiment, the (so-called) readback signal can be presented in various forms including an analog form that is raw or cleansed (e.g., smoothed or otherwise filtered to some degree) and including a digital form (e.g., using high-resolution samples) that might also be raw or somewhat cleansed.

In certain embodiments, the analog front-end signal processing circuit has data-processing channels for the respective multiple tracks and a signal estimation circuit providing estimated values of the respective readback signals for the read data stored in the multiple tracks. The signal estimation circuit includes an analog-to-digital conversion circuit and a digital filter for cleaning/shaping the readback signal. The analog-to-digital conversion circuit can be implemented to convert an analog version of the readback signal to a digital signal that, in turn, is next processed for filtering (e.g., using a detection algorithm) and presenting a version of the signal into a digital sequence.

In a typical disc drive application, the transducer (read head) presents such a readback signal by detecting, in a time sequence, the alterations on the medium and generating a sequence of corresponding pulses in an analog form. These pulses are then detected and decoded by read channel circuitry in order to reproduce the digital sequence corresponding to the digital data as stored in the track of the disc. Discrete time sequence detectors can be advantageous because they compensate for intersymbol interference (ISI) and are less susceptible to channel noise. Commonly-used discrete time sequence detection methods include, among many others, discrete time pulse detection, maximum likelihood sequence detection, Viterbi detection, decision-feedback equalization, and variations of these including combinations thereof. Accordingly, Viterbi filtering is one such implementation for presenting a somewhat cleansed and shaped digital version of the readback signal.

In various disc drive embodiments, signal processing is performed for each of an associated one of the multiple tracks, using an analog front-end signal processing circuit, and a signal estimation circuit. The analog front-end signal processing circuit includes a variable gain amplifier providing (e.g., fixed) gain to the readback signal, and a continuous time filter providing a version of the readback signal in which noise, present in an output signal from the variable-gain amplifier, is removed. The signal estimation circuit includes an analog-to-digital conversion circuit for converting an analog version of the readback signal to a digital signal, and a digital filter as discussed above for shaping the digital signal and providing estimated values of the respective feedback signals based on the shaped digital signal.

Additionally, certain embodiments are implemented with the multiple-track signal correction circuitry being configured to cancel such asymmetry noise in the readback signals by executing a mathematical process that operates on data from each of multiple tracks. A mathematical process can be used for such correction/cancellation by operating on inputs including the signal expected to be read from the target track (or "the expected signal"), a correction coefficient and the number of the multiple tracks involved. In more specific embodiments, a multiple-track signal correction circuit compensates for asymmetry noise in the readback signal of the read data stored in at least one of the multiple tracks, relative to an expected signal based on estimated values (as computed using a predictive/adaptive algorithm), and different correction coefficients for respective ones of the multiple tracks.

Consistent with the above, methods are also disclosed that can include the steps of reading data stored in multiple tracks, and compensating for asymmetry in the readback signal. Specifically, the step of reading data is accomplished by using a magneto-resistive transducer assembly, reading data stored in the multiple tracks and providing therefrom a readback signal from each of the multiple tracks. In some embodiments, the method includes the step of compensating for asymmetry in the readback signal of the read data stored in at least one of multiple tracks, relative to an expected signal as processed by the discrete time sequence detection/filtering, based on different correction coefficients for respective ones of the multiple tracks.

Certain aspects of the present disclosure are related to correction for such asymmetry based on the recognition or discovery that related distortion of the signal being read back by a transducer is at least in part due to the effect of the multiple tracks being adjacently situated. In connection with these aspects of the present disclosure, the above-discussed signal correction circuitry can be configured and arranged for effecting correction of the readback signal based on the assumptions or belief that such asymmetry is attributable to significant distortions relating (or corresponding) to magnetic data patterns stored on both the track targeted to be accessed and its adjacent track(s).

Figure 1A:
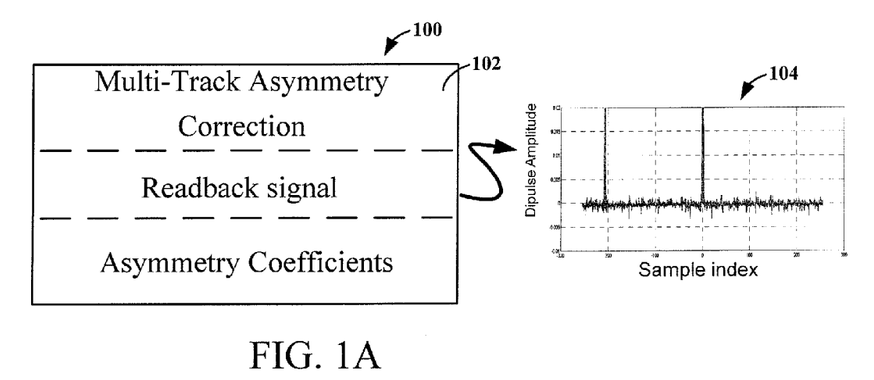
FIG. 1A is a block diagram of an apparatus, consistent with various aspects of the present disclosure.
Figure 1B:
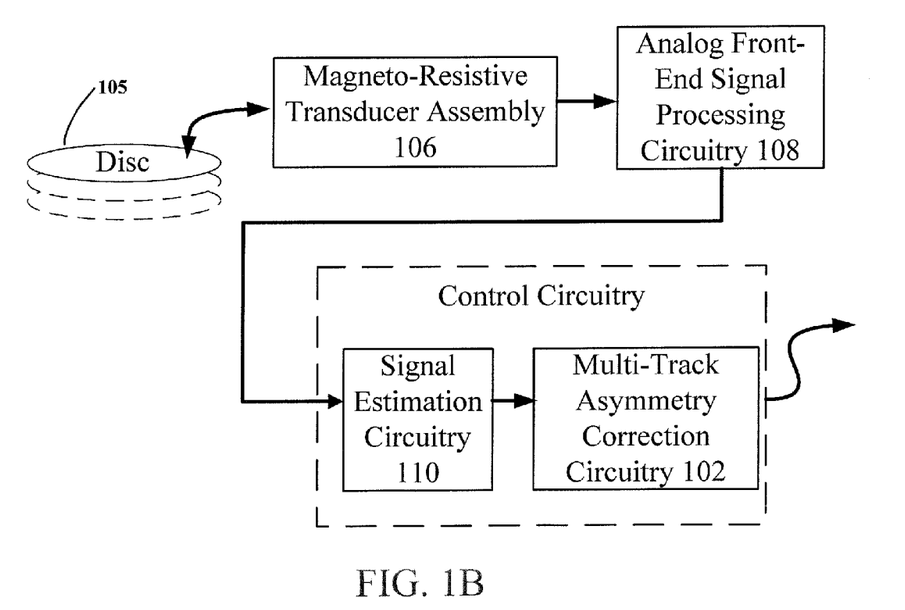
FIG. 1B is a partial block diagram of a disc drive environment, consistent with various aspects of the present disclosure.

Turning now to the figures, various examples of the present disclosure are presented by way of the illustrations provided beginning with FIGS. 1A and 1B. Consistent with the above-discussed exemplary context, FIG. 1A illustrates an apparatus 100 that includes circuitry configured to present a readback signal representing data stored in at least one of multiple tracks on a data-recording disc and also includes a multi-track asymmetry correction circuit 102 configured to compensate for asymmetry in the readback signal by using different correction coefficients for respective ones of the multiple tracks. In more specific embodiments, the apparatus 100 is implemented as one or more disc drives with circuitry including or responsive to a transducer for reading the data from each of the multiple tracks.

As depicted in the graph 104, the apparatus 100 provides a relatively noise-free output signal as graphically shown in the form of an extracted dipulse (or dipulse signals). More specifically, the graph 104 shows the output of the multi-track asymmetry correction circuitry 102 as a time-sequence signal that is corrected for distortions caused by asymmetry noise/echoes picked up and carried from the MR reader 106. The correction would be evident in the dipulse extraction as very low or no amplitude signal (echo) at the sample index corresponding to distortions.

In certain embodiments in which such an apparatus 100 includes a disc drive, the disc drive can include a multi-track asymmetry correction circuit 102, a disc with data stored in multiple tracks thereof, and a magneto-resistive transducer assembly (MR reader). In many applications, the MR reader presents readback signal to the multi-track asymmetry correction circuitry 102 for processing within the disc drive but it will be appreciated that the readback signal can be transmitted elsewhere for such processing with the multi-track asymmetry correction circuitry 102 being located in a communicatively-coupled network server, cloud computing system, etc.

FIG. 1B is a partial block diagram of a disc drive environment, also consistent with the above discussion and related embodiments. Data, as magnetically stored in a track on the disc 105, is read by the MR reader 106. As illustrated, after sensing the magnetically stored signals on the disc 105, the MR reader 106 presents an electrical version of sensed signal as the (raw) readback signal, to an input electrode at the analog front-end signal processing circuitry 108. As discussed in more detail further below, the analog front-end signal processing circuitry 108 conditions the readback signal prior to transmitting the readback signal to the control circuitry comprising signal estimation circuitry 110 and multi-track asymmetry correction circuitry 102. The control circuitry, as discussed in more detail below, conditions the readback signal and corrects for asymmetry noise/echoes that may be carried in the readback signal.

Such asymmetry has been recognized, in connection with the present disclosure, as being due to the effect of the multiple tracks being adjacently situated. The above-discussed signal correction circuitry is configured and arranged for effecting correction of such readback signal as processed by the transducer. In this context, such asymmetry in the readback signal is believed to be due at least in part to significant distortions relating to magnetic data patterns stored on both the track targeted to be accessed and its adjacent tracks. The data patterns create a plurality of magnetic fields that, when read by the transducer (a read head or the MR reader 106), distort the true signal as represented by the stored data in the transducer-targeted track of the disc. The distortions are also believed to be partially due to manufacturing imperfections of pinning fields in the magneto-resistive transducers. In certain embodiments, the distortions include (but are not necessarily limited to) one or more of the following: background and foreground asymmetry noise, asymmetry echoes, background and foreground saturation, and non-linear mixing of background and foreground signal.

It has also been recognized that by correcting for such asymmetry in the (raw) readback signal, before being processed by a partial response maximum likelihood sequence detection (PRML) channel, a higher mean square error in the detection stage of the PRML channel can be avoided. In certain circumstances, the position of the reader relative to adjacent data tracks may create a readback signal that appears to be devoid of any asymmetry response. However, the readback signal should still be processed for asymmetry because, if left uncompensated, the readback signal will result in a higher error rate when processed later in the channel by signal detection circuitry. By correcting for asymmetry in the readback signal, the adverse effects due to multiple adjacent tracks are significantly mitigated (or removed entirely) as most noticeably apparent when comparing corrected and uncorrected output signal error rates and/or the independent asymmetry echoes/effects as broken down for each track.

Figure 2A:
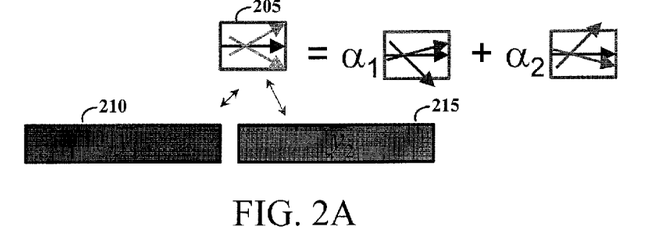
FIG. 2A is a diagram illustrating the isolated track stray magnetic fields underlying the ostensibly symmetric response of the magneto-resistive read head to the magnetic media data, consistent with various aspects of the present disclosure.
Figure 2B:
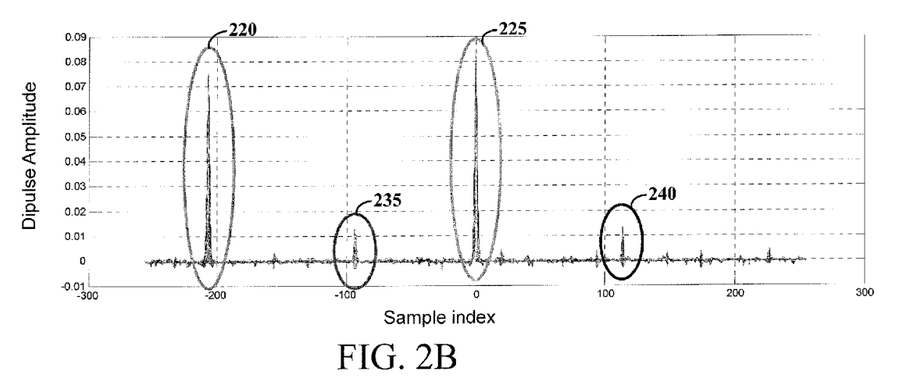
FIG. 2B is a dipulse map illustrating the isolated track signals, and asymmetry distortions of those tracks, consistent with various aspects of the present disclosure.
Figure 2C:
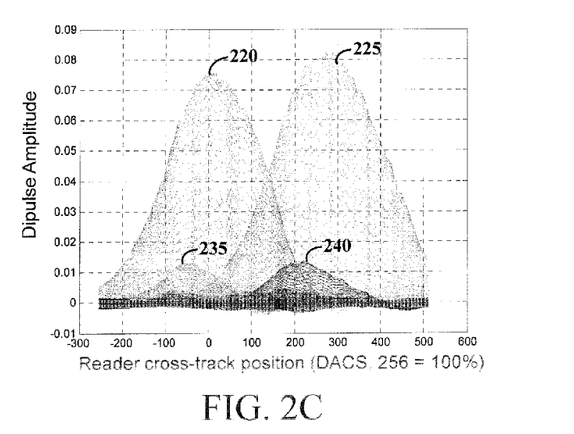
FIG. 2C is an over-laid dipulse map illustrating the isolated track signals, and phase off-set asymmetrical distortions, consistent with various aspects of the present disclosure.

Such asymmetry in the readback signal might be better appreciated with reference to FIGS. 2A-C. FIG. 2A shows a diagram illustrating the effect of magnetic stray fields from multiple data tracks 210 and 215 and that act on a magnetic-resistive transducer assembly 205 (or read head). Each data track in isolation has a magnetic stray field ideally situated over the track for which the read head would ideally respond to pick up the signal in the track corresponding to the stored data. Due to the location of MR reader 205 being non-ideal relative to the targeted track of the magnetic media data 215 (as shown in FIG. 2A being offset to left of center), the signal captured by the MR reader 205 manifests asymmetric distortions due to the magnetic fields of both magnetic media data 210 and 215 acting on the MR reader 205 pinning fields. The orientation of the magnetic fields from track 210 cause the MR reader 205 pinning field to be alternatively increased or reduced when the track 210 signal is positive or negative, respectively. This change to the MR pinning introduces a negative asymmetry with respect to the track 210 data, as the negative response of the reader is stronger than the positive response.

In contrast, the magnetic fields from track 215 cause the MR reader pinning field to be alternatively reduced or increased when the track 215 signal is positive or negative, respectively. This change to the MR pinning introduces a positive asymmetry with respect to the track 215 data, as the positive response of the reader is stronger than the negative response. As discussed above, this results in a sensed signal that is ostensibly more symmetric when analyzed using standard asymmetry correction circuitry. However, the response only appears to be symmetric as the two asymmetric responses of $a_2$ and $a_1$ can have the observed effect of canceling one another.

FIG. 2B is a graph that displays a dipulse map to illustrate relevant signals for the isolated tracks including the signal from the (targeted) magnetic media data 215 (FIG. 2A) which the MR reader is shown as being directed to read. This targeted signal is represented by the foreground track signal 225. To the left of this targeted signal is background track signal 220 which represents the data of neighboring media data 210 (as illustrated in FIG. 2A). Asymmetry (echo-like) distortions are depicted by signals 235 and 240 on either side of the targeted signal (or foreground track signal 225).

In FIG. 2C, shown therein is an over-laid dipulse map illustrating the isolated track signals 220 and 225 (for two disc tracks), and phase off-set asymmetrical distortions 235 and 240 as read by the MR reader 205 in FIG. 2A. The foreground asymmetry signal 240 represents the asymmetry-induced distortions of magnetic media data 215. The background asymmetry signal 235 representing the asymmetry-induced distortions of media data 210. Accordingly, the resulting signal as read by the MR reader (205 in FIG. 2A) is a summation of all the isolated signals (as shown in FIG. 2B). As noted above, the phase offset of the asymmetrical distortions 235 and 240, as shown in FIG. 2C, if not compensated for, can result in a higher error in a detection stage.

The skilled artisan would appreciate that such dipulse mapping and related background technology is well published in the disc drive literature. This background technology includes dipulse extraction and approaches for characterizing non-linearities of readback signals and characterization of signal parameters such as $\bar{y}_1$ and $a_1$ discussed herein. For example, for a discussion of dipulse extraction for analyzing nonlinearities including reader asymmetry, reference may be made to two articles by Dean Palmer et. al., as follows:

*Characterization of the Read/Write Process for Magnetic Recording*, IEEE Transactions on Magnetics, Vol. 31, No. 2, March 1995; and *Identification of Nonlinear Write Effects Using Pseudorandom Sequences*, IEEE Transactions on Magnetics, Vol. Mag-23, No. 5, September 1987. Such previously-known dipulse extraction methodology (in which non-linear or quadratic transfer functions are applied) is useful to characterize and calibrate such asymmetry compensation coefficients for a multi-track asymmetry correction according to certain embodiments of the present disclosure.

Figure 3:
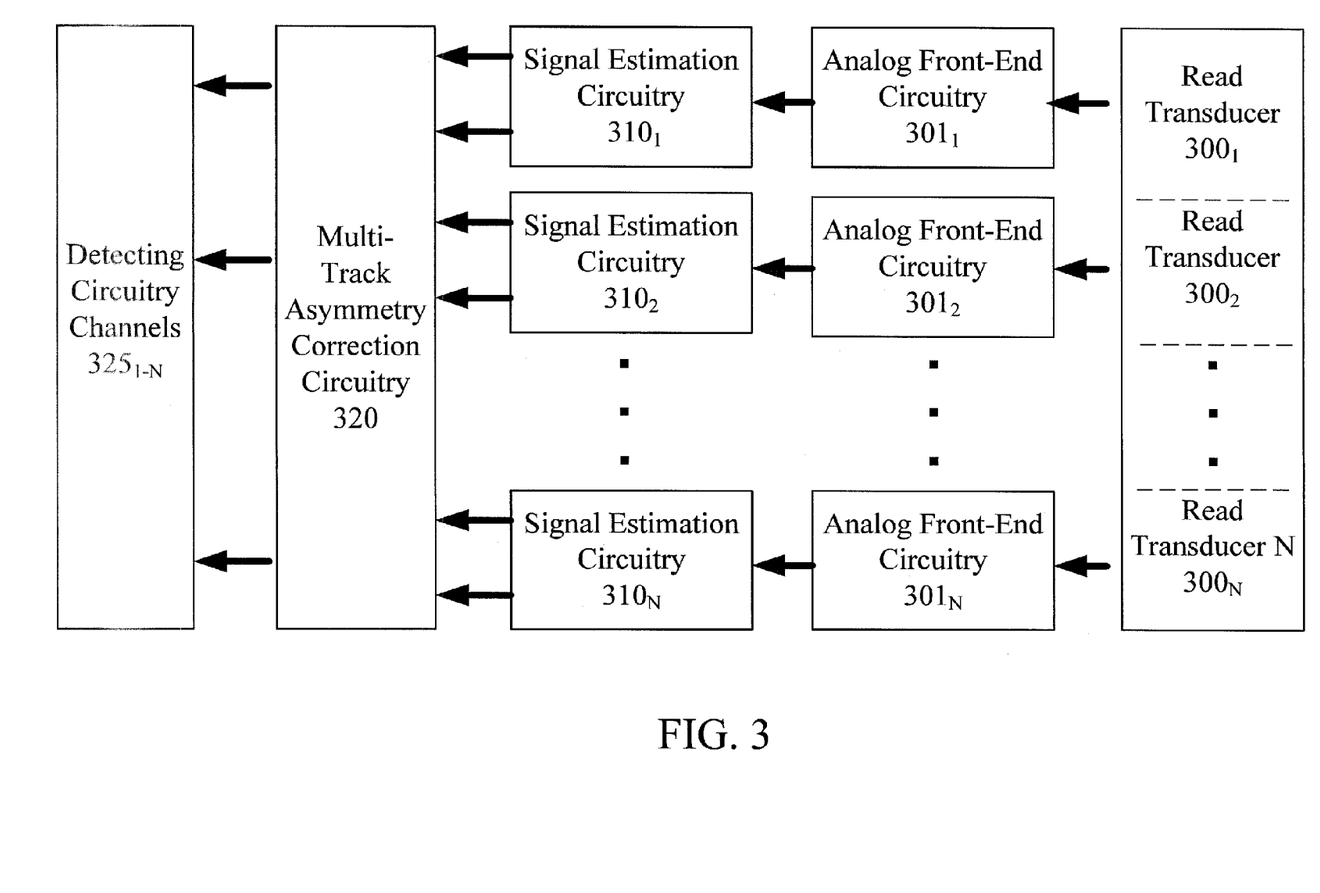
FIG. 3 is a partial block diagram of a multi-reader disc drive with multiple-track signal correction circuitry for each reader, consistent with various aspects of the present disclosure.

Referring now to FIG. 3, shown therein is a partial block diagram of a multi-reader disc drive with multiple-track signal correction circuitry for each reader, consistent with yet further embodiments. In FIG. 3, the readback signal of each respective transducer (or read head) has its own independent signal-processing compensation circuitry (channel) for respective multi-track asymmetry correction. According to the exemplary embodiment in FIG. 3, MR reader ("read transducer") $300_{1-N}$ transmits a signal indicative of the readback signal provided by the MR reader in response to the presence of the magnetic data in the targeted track. This readback signal is provided from the MR reader $300_{1-N}$ to an associated analog front-end signal processing circuit $301_{1-N}$. As discussed above, the analog front-end signal processing circuit $301_{1-N}$ and a signal estimation circuit $310_{1-N}$ perform signal conditioning and provide (or transmit) the appropriate signals needed by the multi-track asymmetry correction circuitry 320 for performing multi-track signal correction. Data signal detection can then be performed, after this multi-track signal correction, on the corrected signal using detecting circuitry channels (detector) $325_{1-N}$ as is conventional.

After being processed by some form of front-end signal processing circuitry, asymmetric signal issues can be treated for in the readback signal of each track in a number of different ways. As an example, in one embodiment the asymmetric signal issues can be mitigated by signal-error recognition and table look-up compensation. In such implementations, look-up tables could be used to pre-store recognizable signal errors and their corresponding correction signals. Using laboratory testing and/or computations, a discrete number of asymmetry echoes (signal errors) can be developed and stored based on representative distortion-causing patterns. Compensating correction signals can be combined with readback signal as similarly determined by laboratory testing and/or computations. Depending on the range of distortion-causing patterns and the extent to which the asymmetric signal would need to be corrected, more or less look-up memory tables and laboratory evaluation would be needed. Assuming a relatively fast access for the data entries in the look-up memory tables, this approach might be computationally efficient.

Figure 4:
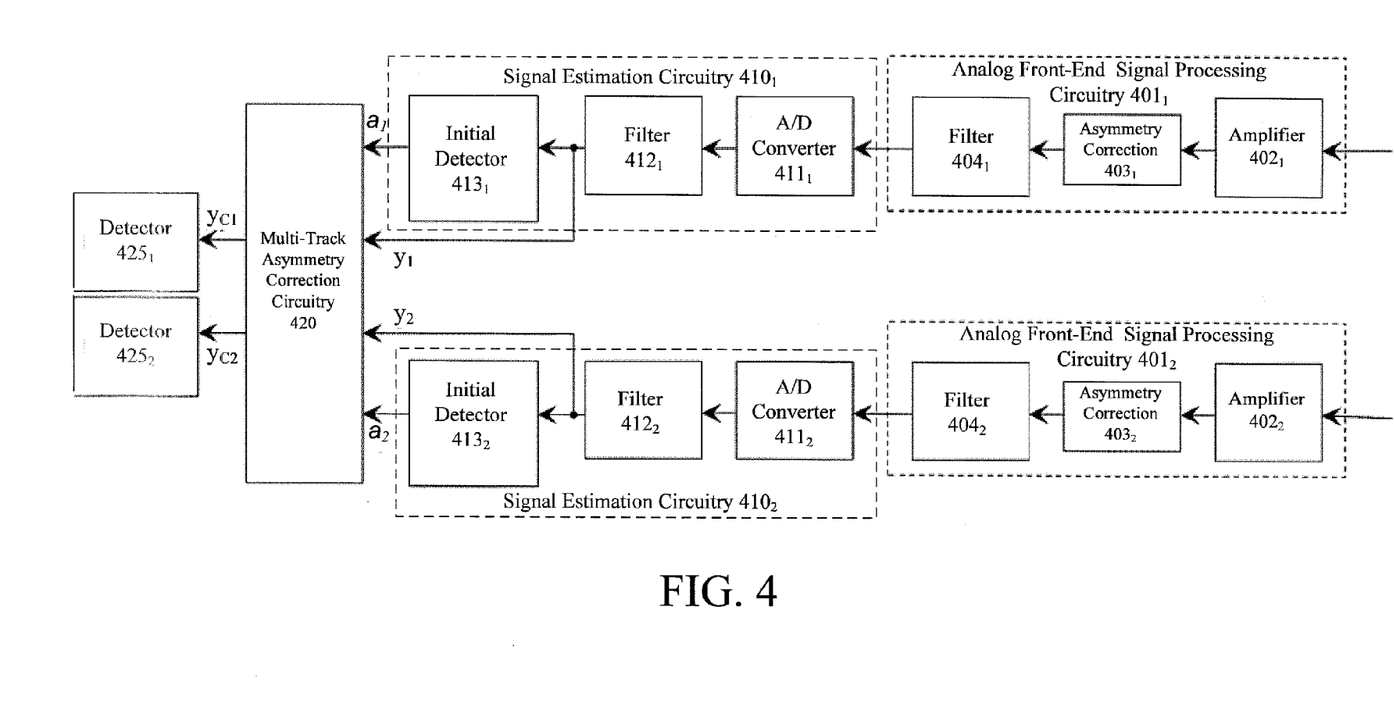
FIG. 4 is a more detailed block diagram of a multi-reader disc drive with multiple-track signal correction circuitry for each reader, consistent with various aspects of the present disclosure.

FIG. 4 illustrates another approach for treating the asymmetric signal issues for the readback signal(s). The type of embodiment illustrated in connection with FIG. 4 employs the use of specific signals which are generated internal to the signal estimation circuitry shown therein for certain specific exemplary implementations. According to one embodiment of the present disclosure, each of a plurality of readback-signal channels has a transducer that provides an associated readback signal to an associated analog front-end signal processing circuit. One such transducer and its associated analog front-end signal processing circuitry are depicted in a first channel as circuitry $401_1$ and $401_2$, respectively. In certain embodiments, the analog front-end signal processing circuitry 401 is implemented to amplify the readback signal via a variable gain amplifier 402 and to filter noise via filter 404 which can be any of a variety of different types of noise-reducing filters (e.g., continuous time-filter (CTF), low-pass filter).

From the analog front-end signal processing circuitry 401, the amplified and conditioned signal is then presented to signal estimation circuitry 410 which generates certain signal parameters, from each of the relevant tracks, useful for asymmetric signal correction 403 by computing one of multiple mathematical algorithms as a function of these signal parameters. The signal estimation circuitry 410 performs an analog-to-digital conversion at block 411, which further conditions (or filters) via filter circuit 412 (e.g., finite impulse response filter (FIR), or other digital filter) to further filter and shape the digitized signal to have optimal behavior characteristics for transmission to the initial detector $413_1$, for example, by implementing a predictive algorithm such as soft-output Viterbi (SOVA). It will be appreciated that such analog-to-digital conversion samples the incoming data (e.g., post-continuous time filtering) at a given data rate for quantizing the processed version of the readback signal for certain N-bit precision.

The initial detector $413_1$ outputs the detected data bits from the first track ($a_1$), and the filter $412_1$ outputs the actual digitized signal ($y_1$) from the first track. The duplicative analog front-end circuitry and signal estimation circuitry 2, 3, ..., N (as shown in FIGS. 3 and 4) function in the same manner, providing the output $a_N$ and $y_N$ to the multi-track asymmetry correction circuitry to compensate for the multi-track asymmetry in the readback signal of the respective MR reader. The detected data bits $a_1, a_2, \ldots$ and the signals $y_1, y_2, \ldots$ are then used by the multi-track asymmetry correction circuitry 420 along with the respective asymmetry correction coefficients $\alpha 1, a_2, \ldots$ to compensate for the asymmetry in the readback signal of the MR reader. (Note that a refers to the detected data pattern while a refers to the multi-track asymmetry correction coefficient). The multi-track asymmetry correction circuitry operates by executing a mathematical algorithm that involves the expected signal from each of the multiple tracks. This expected signal is formed by convolving the detected data a with the channel target. The corrected signal ($y_{C1-N}$) is then output to detector $425_{1-N}$ which runs the signal through another SOVA. While each of the illustrated readback-signal channels is shown to include an independent set of analog front-end signal processing circuitry, signal estimation circuitry and multi-track asymmetry correction circuitry, it will be appreciated that other contemplated embodiments are implemented with the respective MR reader channels sharing some/all of the respective signal processing compensation circuitry.

Figure 5:
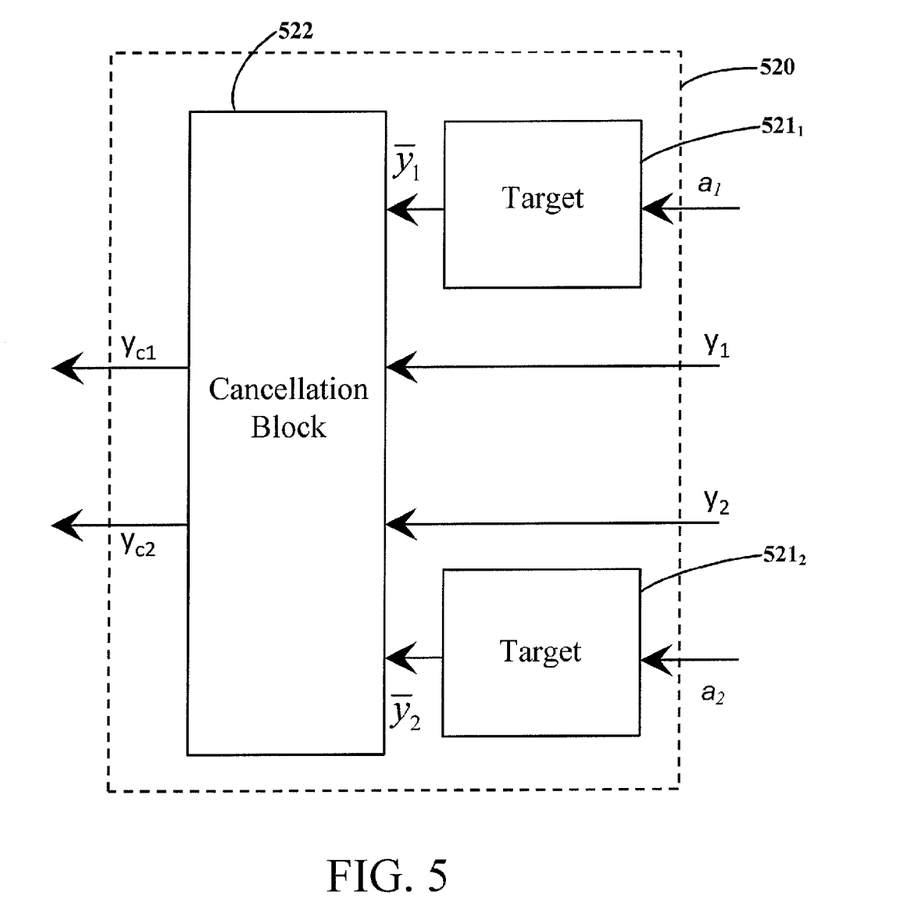
FIG. 5 is a more detailed view of the multi-track signal correction circuit, consistent with various aspects of the present disclosure.

FIG. 5 shows a more detailed view of the multi-track asymmetry correction circuitry 520, consistent with other aspects of the present disclosure. In FIG. 5, a single multi-track asymmetry correction circuit 520 services, in similar manners, both respective readback signals of multiple (first and second) readback-signal channels (in other embodiments, readback-signal channels may have separated/dedicated multi-track asymmetry correction circuits for respective readback signals). Using the first channel as a representative channel, the detected bit stream, denoted as $a_1$, is convolved with its respective target signal at block or module $521_1$. As discussed above with FIG. 4, the detected bit stream a1 is provided by initial detector (e.g., $413_1$ of FIG. 4) as an estimate of the data from track 1. Block $521_1$ yields an estimation of the expected signal ($\bar{y}_1$) which is provided to the cancellation block 522. In a similar manner, Block $521_2$ will calculate an expected signal ($\bar{y}_2$) from the data from track 2 and provide this to Block 522.

In the explanation above, the expected signal was formed by a convolution of detected data bits with a channel target. In another implementation, the detected data bits weighted by soft-information associated with their detection confidence could be used. In another implementation that may be more appropriate for factory calibration, known fixed patterns could be used throughout the test process when writing to the multiple tracks under consideration, and these known fixed patterns could be used in place of detected bit patterns.

Using any of various methods including, for example, the above-noted dipulse extraction methodology, such a method can be used to characterize and calibrate $\alpha_1, \alpha_2, \ldots$. In other embodiments, a two-dimensional gradient search or sweep of the potential values of $\alpha$ can provide the best-performing value of the signal parameter denoted as $\alpha$. In further embodiments and in a manner consistent with the above implementation of look-up tables, the value of the asymmetry correction coefficient $\alpha$ for a given readback signal can be determined based upon a look-up table populated either through regular use of the disc drive apparatus, or during a manufacturing testing process, whereby the block 522 determines $\alpha$ based on the $\alpha$ value generally associated with the target read sector, bit, track, or other method of association between a target read area and $\alpha$ value.

The cancellation block 522 of the multi-track asymmetry correction circuitry 520 cancels/compensates for the multi-track asymmetry in the readback signal, using either a multi-track asymmetry correction summation mode or a multi-track asymmetry correction product mode. Using either mode, the cancellation block 522 produces the corrected signal ($y_{C1}$, $y_{C2}$) for readback signals 1 and 2.

As discussed above, the cancellation block 522 cancels asymmetry echoes in the readback signals. In certain embodiments, the cancellation block performs a computation that has the effect of canceling the asymmetry (echoes) in the readback signals by executing a summation-based process from which corrected signals for each of the readback signals are provided. Certain embodiments of the present disclosure are characterized by the summation-based process being a function of, for each of an associated one of the multiple tracks, the expected signal, the correction coefficient and the number of the multiple tracks.

In one summation-based process embodiment, the summation-based process using a computation such as follows:

$$y_{c1} = y_1 \left(1 - \sum_{n=1}^{N_t} \alpha_n \bar{y}_n \right)$$

$$y_{c2} = y_2 \left(1 - \sum_{n=1}^{N_t} \alpha_n \bar{y}_n \right)$$

Equation 1 where, for each of an associated one of the multiple tracks, $\bar{y}_n$ is the expected signal, $\alpha_n$ is the correction coefficient and n is the number of the multiple tracks.

In other embodiments of the present disclosure, the cancellation block 522 effects cancelation of asymmetry (echoes) in the readback signals and therefrom produces corrected signals for each of the readback signals by executing a product-based process. Such a process can be implemented with a computation performed as a function of, for each of an associated one of the multiple tracks, the expected signal, the correction coefficient and the number of the multiple tracks. In one type of product-based process embodiment, the product-based process performs a computation as follows:

$$y_{c1} = y_1 \cdot \prod_{n=1}^{N_t} (1 - \alpha_n \bar{y}_n)$$

$$y_{c2} = y_2 \cdot \prod_{n=1}^{N_t} (1 - \alpha_n \bar{y}_n)$$

Equation 2

In Equation 2, for each of an associated one of the multiple tracks, the signal parameter $\bar{y}_n$ is the expected signal, whereas the signal parameter $\alpha_n$ represents the correction coefficient, and n is the number of the multiple tracks.

Figure 6A:
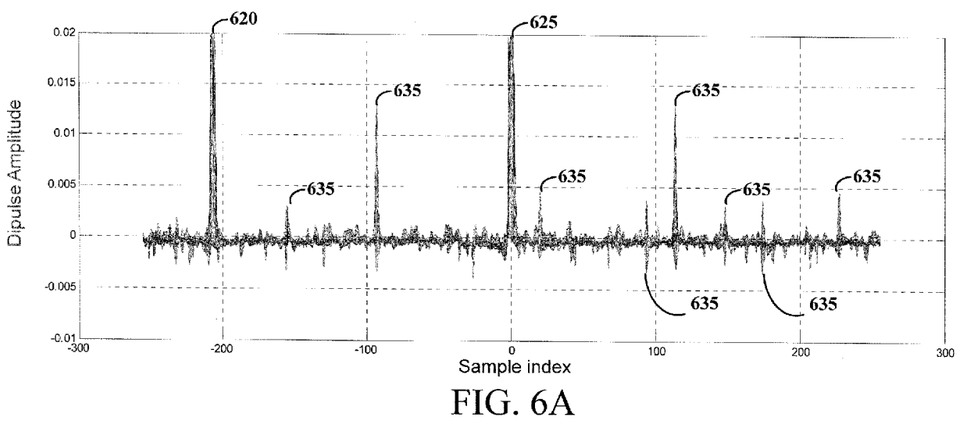
FIG. 6A is a dipulse map illustrating the isolated track signals, and asymmetry distortions of those tracks before multi-track asymmetry correction, relating to the above-noted aspects.
Figure 6B:
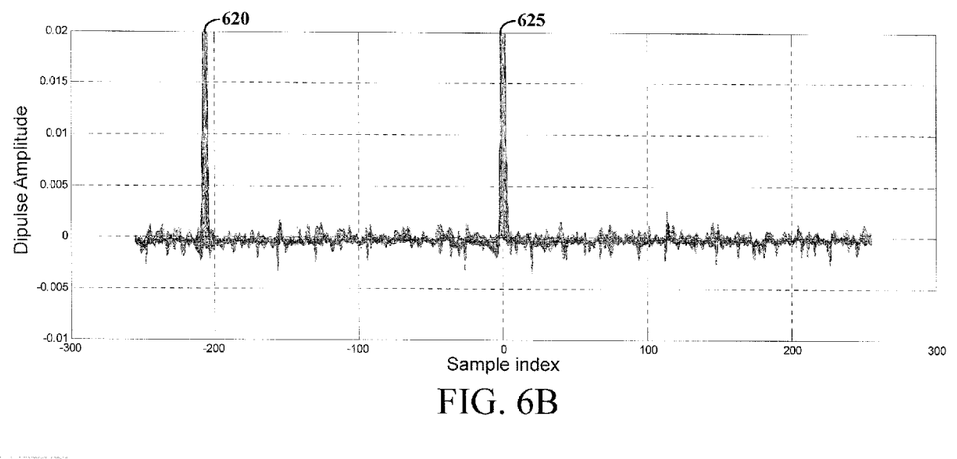
FIG. 6B is a dipulse map illustrating the isolated track signals, and asymmetry distortions of those tracks after multi-track asymmetry correction also relating to the above-noted.

The multi-track asymmetry correction for MR reader readback signals, as presented in certain experimental/detailed embodiments, has been modeled and tested to evidence significant and surprising results attributed to the use of such multi-track asymmetry correction circuitry. In support, FIGS. 6A and 6B illustrate such results corresponding to an actual signal processed along such readback signal channels. By way of dipulse maps, these results are shown without multi-track asymmetric correction (FIG. 6A) and with multi-track asymmetric correction (FIG. 6B). More specifically, FIG. 6A shows a dipulse map with the isolated track signals of both the background track 620 and foreground track 625, and with distortions 635 (asymmetry distortions, asymmetry echoes, saturation, mixing echoes, etc.) relevant to these isolated tracks. FIG. 6B shows a corresponding dipulse map with resulting readback signal compensation as evidenced by reduced or negligible distortions at all regions apart from the isolated track signals of tracks 620 and 625.

Various modules or other circuits may be implemented to carry out one or more of the operations and activities described herein and/or shown in the figures. In these contexts, such modules or blocks are understood to be circuitry that carries out one or more of the described operations/activities (e.g., analog front-end signal processing circuitry, signal estimation circuitry, or multi-track asymmetry correction circuitry). For example, in certain of the above-discussed embodiments, such modules or blocks are discrete logic circuits or programmable logic circuits configured and arranged for implementing these operations/activities, as in the circuit modules shown in FIGS. 1, 3, and 4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain other embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present disclosure without strictly following the exemplary embodiments and applications illustrated and described herein. For example, the claimed circuits/modules need not be present in the disc drive itself, but instead can be located in a host device that controls a disc drive. Such modifications do not depart from the true spirit and scope of the present disclosure, including that set forth in the following claims.

What is claimed is:

1. An apparatus comprising:
a first circuit configured to present a readback signal representing data stored in at least one of multiple tracks on a data-recording disc; and
a multiple-track signal correction circuit connected to the first circuit and configured to compensate for asymmetry in the readback signal using different correction coefficients for respective ones of the multiple tracks to compensate for distortions relating to magnetic data patterns stored on a track of the disc that is targeted to be accessed as magnetic data patterns stored on adjacent tracks.

2. The apparatus of claim 1, wherein the apparatus includes at least one disc drive having a data-recording disc and a transducer assembly configured and arranged to read data stored in the multiple tracks of the disc, wherein the transducer assembly is configured and arranged to provide the readback signal.

3. The apparatus of claim 1, further comprising: an analog front-end signal processing circuit having data-processing channels for the respective multiple tracks; and a signal estimation circuit configured and arranged to provide estimated values of the respective readback signals for the read data stored in the multiple tracks, wherein the multiple-track signal correction circuit is further configured and arranged to use estimated values for the asymmetry compensation.

4. The apparatus of claim 3, wherein the multiple-track signal correction circuit is further configured and arranged to compensate for asymmetry in the readback signals by using samples of the readback signals and convolving the estimated values and therefrom cancelling asymmetry distortions in the readback signal.

5. The apparatus of claim 1, wherein the multiple-track signal correction circuit is further configured and arranged to compensate for asymmetry in the readback signals by using samples of the readback signals and convolving estimated values of the respective readback signals for the read data stored in the multiple tracks and therefrom cancelling asymmetry distortions in the readback signal.

6. The apparatus of claim 1, further comprising a signal estimation circuit including a digital filter configured and arranged to shape a digital version of the readback signal, and wherein the signal estimation circuit is configured and arranged to respond to the digital filter by executing a Viterbi process on the shaped digital signal.

7. The apparatus of claim 1, further comprising a signal estimation circuit including a digital filter configured and arranged to shape a digital version of the readback signal, and wherein the signal estimation circuit is configured and arranged to respond to the digital filter by executing a filtering process on the shaped digital signal, and wherein the multiple-track signal correction circuit is further configured and arranged to respond to the signal estimation circuit for each of associated ones of the multiple tracks by compensating for asymmetry in the readback signal, and by convolving estimated values of the readback signal.

8. The apparatus of claim 1, wherein the multiple-track signal correction circuit is further configured and arranged to cancel asymmetry distortions in the readback signals by executing a mathematical algorithm that operates on data from each of the multiple tracks.

9. The apparatus of claim 8, wherein the mathematical process is a function of an expected signal corresponding to the data, the correction coefficient and the number of the multiple tracks.

10. An apparatus comprising:
a disc drive including
a disc,
a transducer assembly configured to read magnetically-stored data stored in multiple tracks of the disc by providing a readback signal from each of the multiple tracks;
for each of an associated one of the multiple tracks
a front-end signal processing circuit including an amplifier configured and arranged to provide gain to the readback signal and including an analog filter configured and arranged to provide a version of the readback signal in which noise, present in an output signal from the amplifier, is removed, and
a signal estimation circuit including an analog-to-digital conversion circuit configured and arranged to convert an analog version of the readback signal to a digital signal, and including a digital filter configured and arranged to shape the digital signal and to provide estimated values of the respective readback signals based on the shaped digital signal; and
a multiple-track signal correction circuit configured and arranged to compensate for asymmetry in the readback signal of the read data stored in at least one of multiple tracks, based on the estimated values and different correction coefficients for respective ones of the multiple tracks to compensate for distortions relating to magnetic data patterns stored on a track of the disc that is targeted to be accessed as magnetic data patterns stored on adjacent tracks.

11. The apparatus of claim 10, wherein the multiple-track signal correction circuit is further configured and arranged with targets for the respective multiple tracks and with a cancellation module configured and arranged to operate on outputs from the targets, the targets being configured and arranged to process the estimated values of the respective readback signals and to provide the outputs to the cancellation module.

12. The apparatus of claim 10, wherein the multiple-track signal correction circuit is further configured and arranged with a cancellation module configured and arranged to cancel asymmetry distortions in the readback signals.

13. The apparatus of claim 12, wherein the cancellation module is configured and arranged to cancel asymmetry distortions in the readback signals by executing a summation-based process from which corrected signals for each of the readback signals are provided.

14. The apparatus of claim 12, wherein the cancellation module is configured and arranged to cancel asymmetry distortions in the readback signals and therefrom produce corrected signals for each of the readback signals by executing a summation-based process as follows:

$$y_{c1} = y_1\left(1 - \sum_{n=1}^{N_t} \alpha_n \bar{y}_n\right)$$

$$y_{c2} = y_2\left(1 - \sum_{n=1}^{N_t} \alpha_n \bar{y}_n\right)$$

where, for each of an associated one of the multiple tracks, $\bar{y}_n$ is an expected signal, $\alpha_n$ is the correction coefficient and n is the number of the multiple tracks.

15. The apparatus of claim 12, wherein the cancellation module is configured and arranged to cancel asymmetry distortions in the readback signals and therefrom produce corrected signals for each of the readback signals by executing a product-based process that is a function of, for each of an associated one of the multiple tracks, an expected signal, the correction coefficient and the number of the multiple tracks.

16. The apparatus of claim 12, wherein the cancellation module is configured and arranged to cancel asymmetry distortions in the readback signals and therefrom produce corrected signals for each of the readback signals by executing a product-based process as follows:

$$y_{c1} = y_1 \cdot \prod_{n=1}^{N_t} (1 - \alpha_n \bar{y}_n)$$

$$y_{c2} = y_2 \cdot \prod_{n=1}^{N_t} (1 - \alpha_n \bar{y}_n)$$

where, for each of an associated one of the multiple tracks, $\bar{y}_n$ is an expected signal, $\alpha_n$ is the correction coefficient and n is the number of the multiple tracks.

17. The apparatus of claim 10, wherein the multiple-track signal correction circuit is further configured and arranged with targets for the respective multiple tracks and with a cancellation module configured and arranged to operate on outputs from the targets, wherein the targets are configured and arranged to process the estimated values of the respective readback signals and to provide the outputs to the cancellation module, and wherein the cancellation module is configured and arranged to cancel asymmetry distortions in the readback signals.

18. An apparatus comprising:
a disc drive including
   a disc,
   a transducer assembly configured to read magnetically-stored data stored in multiple tracks of the disc by providing a readback signal from each of the multiple tracks;
   for each of an associated one of the multiple tracks
      a front-end signal processing circuit including an amplifier configured and arranged to provide gain to the readback signal and including an analog filter configured and arranged to provide a version of the readback signal in which noise, present in an output signal from the amplifier, is removed, and
      a signal estimation circuit including an analog-to-digital conversion circuit configured and arranged to convert an analog version of the readback signal to a digital signal, and including a digital filter configured and arranged to shape the digital signal and to provide estimated values of the respective readback signals based on the shaped digital signal; and
   a multiple-track signal correction circuit configured and arranged to compensate for asymmetry in the readback signal of the read data stored in at least one of multiple tracks, based on the estimated values and different correction coefficients for respective ones of the multiple tracks, wherein the multiple-track signal correction circuit is further configured and arranged with a cancellation module configured and arranged to cancel asymmetry distortions in the readback signals, and wherein the cancellation module is configured and arranged to cancel asymmetry distortions in the readback signals and therefrom produce corrected signals for each of the readback signals by executing a summation-based process that is a function of, for each of an associated one of the multiple tracks, an expected signal, the correction coefficient and the number of the multiple tracks.

19. A method of compensating for asymmetry in readback signals in a storage device comprising:
   reading data stored in multiple tracks of a medium and providing a readback signal from each of the multiple tracks; and
   compensating for asymmetry in the readback signal stored in at least one of the multiple tracks based on different correction coefficients for respective ones of the multiple tracks to compensate for distortions relating to magnetic data patterns stored on a track of the medium that is targeted to be accessed as magnetic data patterns stored on adjacent tracks.

* * * * *